United States Patent [19]

Andrews

[11] 4,431,352

[45] Feb. 14, 1984

[54] FASTENING DEVICE

[76] Inventor: Gary E. Andrews, 5199 Priorybrook, Florissant, Mo. 63033

[21] Appl. No.: 306,139

[22] Filed: Sep. 28, 1981

[51] Int. Cl.³ .............................................. B23B 43/00
[52] U.S. Cl. .......................................... 410/101; 16/2; 248/500; 248/499; 403/164; 410/85
[58] Field of Search ............. 248/500, 499, 59, 503.1, 248/505; 410/101, 112, 113, 114, 85; 16/2, DIG. 33; 403/119, 164; 24/115 K

[56] References Cited

U.S. PATENT DOCUMENTS

| 240,380 | 4/1881 | Buck | 403/164 |
|---|---|---|---|
| 3,273,946 | 9/1966 | Gerner | 403/119 |
| 3,297,293 | 1/1967 | Andrews et al. | 248/499 |
| 4,074,519 | 2/1978 | Garrett | 248/499 |
| 4,295,765 | 10/1981 | Burke | 410/101 |

Primary Examiner—William H. Schultz
Assistant Examiner—Ramon O. Ramirez
Attorney, Agent, or Firm—Cohn, Powell & Hind

[57] ABSTRACT

This fastening device provides a self-contained, tie-down unit by means of which load from a swivel eye is transferred to a base. The fastening device includes a stud, threadedly connectible to a base and mounting a collar and a retainer member. The retainer member supports a bushing member, and the bushing member and collar provide a swivel mount for the load ring. The bushing member and stud cooperate to transfer variable loadings into the base in a manner predictable from their size and configuration.

11 Claims, 6 Drawing Figures

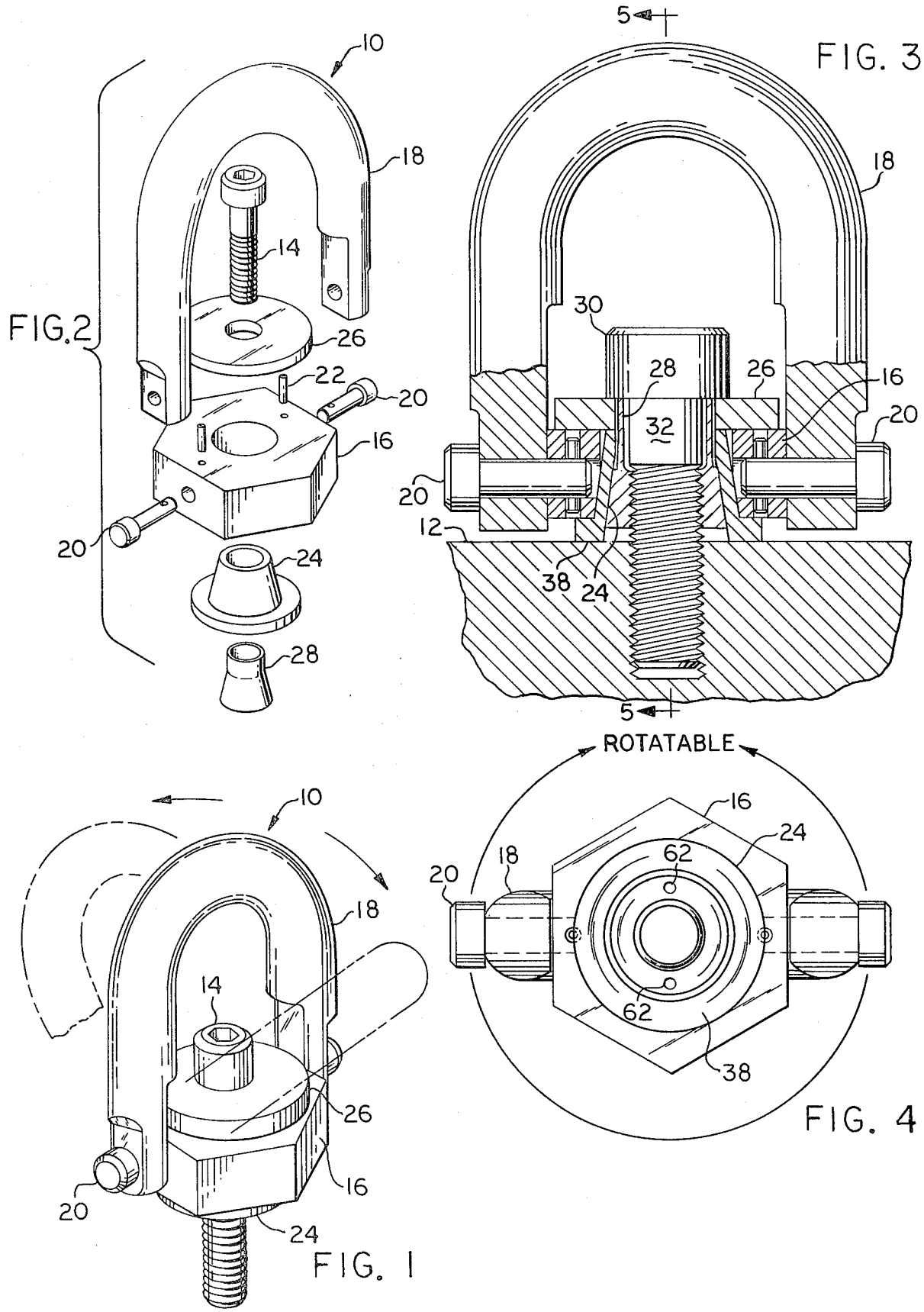

FASTENING DEVICE

BACKGROUND OF THE INVENTION

This invention relates generally to a fastening device and more particularly to an improved, swivel tie-down unit.

Tie-down units of the type under consideration are widely used for a variety of purposes such as providing hold-downs for airplanes, trucks and containers for cargo carried by trucks and for providing lifting eyes for engine blocks and similar items.

In particular, the fastening device which forms the subject matter of this invention represents an improvement over U.S. Pat. No. 3,297,293. Although the fastening device disclosed in this patent has proven effective for its intended purposes it has a relatively high load transfer center. In addition, the retaining element used to hold the fastener device in assembly prior to installation requires the use of a grooved stud and retaining ring.

SUMMARY OF THE INVENTION

This fastening device provides a tie-down unit having an improved load distribution system and an improved system for maintaining the unit in assembly prior to installation.

The fastening device includes a stud having a head and shank, the shank having a lower threaded portion adapted to be fastened to the base and an adjacent upper threaded portion; a retainer member having an inner surface providing a threaded portion, adapted to be received by the stud upper threaded portion, and an outer surface having a bearing portion and a bushing member having an inner surface providing a bearing portion operatively engageable with the outer bearing portion of the retainer member and an end bearing portion operatively engageable with the base. The fastening device also includes a load attaching means pivotally connected to the bushing member in swivel relation for transferring applied load to the bushing member and the stud and from these members to the base.

In one aspect of the invention the retainer member inner surface includes a lower portion providing the threaded portion, and the outer surface includes a lower portion providing the bearing portion.

In another aspect of the invention the bushing member inner surface includes a lower portion providing the bearing portion, and the outer surface includes a lower portion providing the bearing portion.

In still another aspect of the invention the load attaching means includes a load ring having an inner surface providing a lower bearing portion engageable with the outer bearing portion of the bushing member.

In yet another aspect of the invention the retaining member outer bearing portion and the bushing member inner bearing portion are conical.

In another aspect of the invention a collar is disposed about the stud shank engageable with the head, the bushing member includes an upper portion engageable with the collar and a lower end flange engageable with the base, and the load ring is received in rotatable relation between collar and the end flange.

In another aspect of the invention the retainer member upper end bearing portion is received between the collar and the stud and is engageable with the head of the stud.

In yet another aspect of the invention the load ring includes an inner surface providing an upper portion and a lower bearing portion; the retainer member inner surface includes an upper portion spaced from the stud and a lower threaded portion and the outer surface includes an upper portion and a lower bearing portion; and the bushing member inner surface includes an upper portion spaced from the retainer member and a lower bearing portion and the outer surface includes an upper portion spaced from the load ring and a lower bearing portion said bushing member inner and outer bearing portions being engageable with the outer and inner bearing portions of the retainer member and the load ring respectively to lower the line of action of load transfer from the load attachment means.

In another aspect of the invention the inner and outer bearing portions of the bushing, the outer bearing portion of the retainer member and the inner bearing portion of the load ring are conical.

In still another aspect of the invention the retainer member inner and outer surface upper portions are cylindrical, the bushing member inner surface upper portion is cylindrical, and said outer surface upper portion is conical and the load ring inner surface upper portion is cylindrical.

BRIEF DESCRIPTION OF THE DRAWINGS

FIG. 1 is a perspective view of the fastening device;

FIG. 2 is a similar view showing the parts of the device in exploded relation;

FIG. 3 is a side elevated view, partly in cross-section along a vertical plane passed through the stud axis;

FIG. 4 is a bottom plan view of the device;

DESCRIPTION OF THE PREFERRED EMBODIMENT

Figure 5:
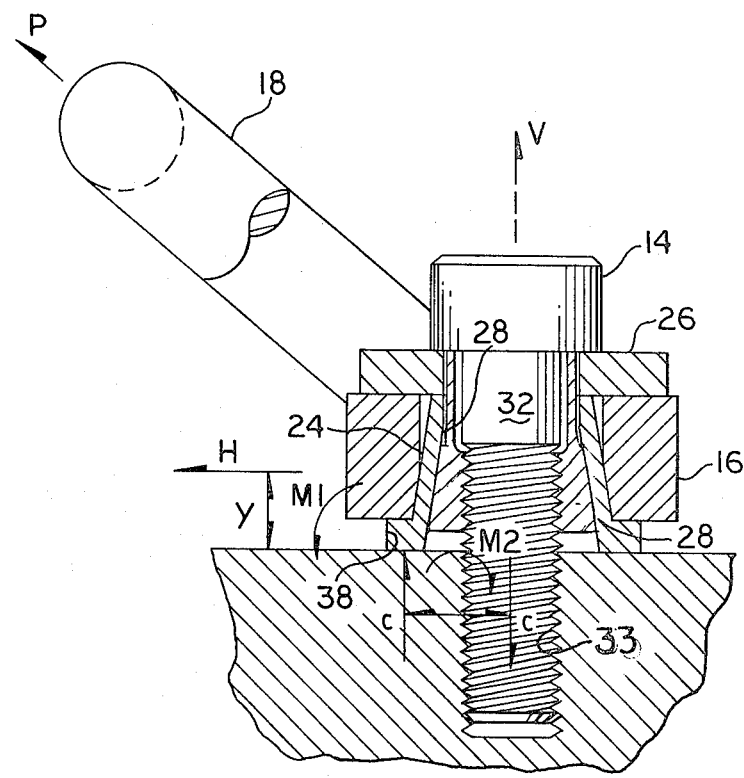
FIG. 5 is a cross-section view taken on line 5—5 of FIG. 3.

Referring now by reference numerals to the drawings and first to FIGS. 1, 2 and 3 it will be understood that the fastening device is generally indicated by numeral 10 which is threadedly attached to a base 12.

The component parts of the device include a stud 14 which is threadedly attached to the base 12 and provides a rotational axis for a load attaching means. As shown, the load attaching means includes a swivel load ring 16 and an eye member 18, said eye member being pivotally mounted to the load ring 16 as by pivot pins 20 held in place by lock pins 22.

Load from the eye member 18 is transferred to the stud 14 by a bushing member 24 and a collar 26 and the component parts of the device are held in assembly prior to installation by a retainer member 28.

Figure 6:
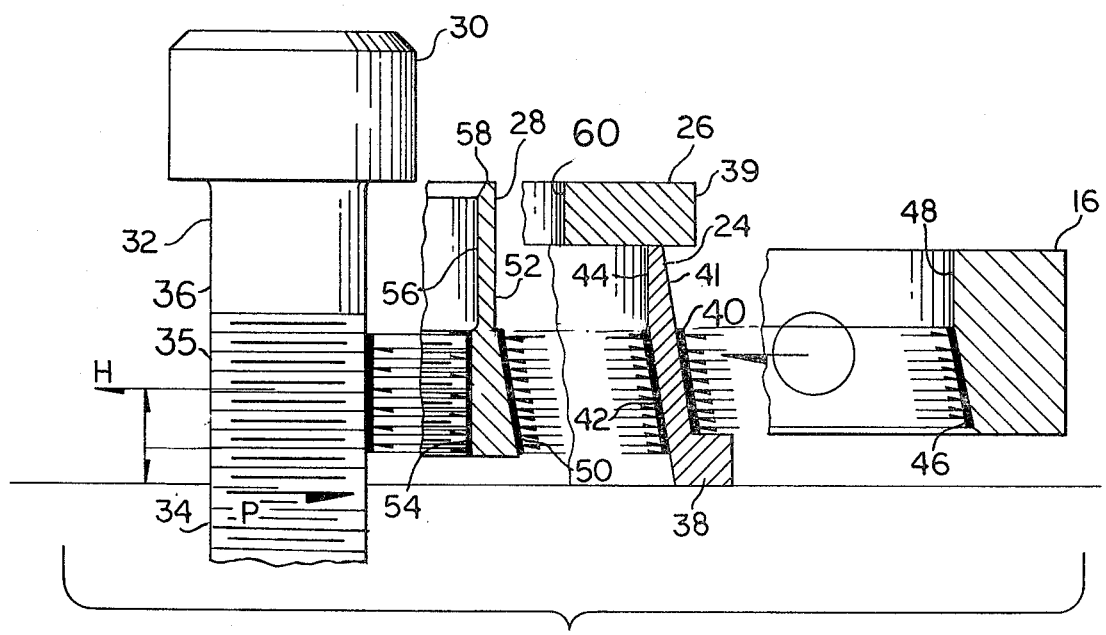
FIG. 6 is a schematic view showing the distribution of forces on the parts of the device.

As best shown by reference to FIGS. 3, 5 and 6 the stud 14 includes an enlarged head 30, which is engageable with the collar 26, and a threaded shank 32 received within the base 12 which is typically a metal plate having a ground attaching means. In the embodiment shown, the base 12 is a metal plate having a threaded opening 33 receiving the lower threaded portion 34 of the shank while an upper, adjacent threaded portion 35 and an unthreaded portion 36 are disposed above the base 12.

The bushing member 24 is generally conically configurated and includes an annular flange 38 providing a lower end bearing portion engageable with the base 12 and an upper margin 39 providing an upper end bearing portion engageable by the collar 26. The load ring 16 is of a thickness to be received in clearance relation between the collar 26 and the bushing member 24 in conformance with the line of action of the force P applied to the load ring 16.

As best shown in FIG. 6 the bushing member 24 includes a outer surface having a lower conical bearing portion 40 and an upper conical portion 41, and an inner surface having a lower conical bearing portion 42 and an upper cylindrical portion 44. The load ring 16 includes an inner surface having a lower conical portion 46, which is bearingly engageable with the lower bearing portion 42 of the bushing member 24, and an upper cylindrical portion 48 which is spaced from said upper portion 41 of said bushing member.

The inner, retainer member 28, includes an outer surface having a lower conical portion 50 engageable with the bushing member lower bearing portion 42, and an upper reduced diameter cylindrical portion 52 spaced from the upper portion 44 of the bushing member 24. The retainer member 28 also includes an inner surface having a lower threaded portion 54, threadedly engageable with the stud threaded portion 34, an upper portion enlarged diameter unthreaded portion 56 spaced from the shank unthreaded portion 36 and an upper margin 58 engageable with the underside of the stud head 30.

Because of the above described arrangement of component parts the lower portions of the ring 16, bushing member 24, retainer member 28 and stud 14 are engageable, while the upper portions of said component parts are not, when the retainer member 28 is received within the collar opening 60 with its upper margin 58 engaged with the underside of the stud head 30 thereby reducing the elevation of the line of action of the load transferred from the attaching means.

It is thought that the structural features and functional advantages of this fastening device have become fully apparent from the foregoing description of parts but, for completeness of disclosure the operation of the device, and interaction of the components will be briefly described.

As will be readily understood by reference to FIGS. 3, 4 and 5, prior to installation, the fastening device stud 14, the load ring 16, the bushing member 24 and the collar 26 are maintained in assembly by virtue of the conical retainer member 28, said member being threaded into position following assembly of said stud, ring, collar and bushing, until it engages or "bottoms out" against the underside of the stud head 20. As shown in FIG. 4, the retaining member 28 includes tool receiving apertures 62 to facilitate installation. As shown in FIGS. 3 and 5, there is a slight lateral clearance between the retaining member 24 and the collar 26 in the assembled condition.

With the components assembled as described the stud 14 can be threadedly connected within the base opening 33 until the collar 26 bears down upon the bushing member 24 and the bushing flange 38 bears upon the surface of the base 12. At this point the collar 26 and bushing member 24 are, to all intents and purposes, substantially integrally formed and provide a groove, defined by the collar 24 and bushing flange 38 about which the load ring 16 can freely rotate.

When a load P is applied to the eye member 18 as shown in FIG. 5, component horizontal and vertical forces H and V respectively are transmitted to the stud 14. The vertical force V is carried by the stud 14 and the horizontal force H produces a turning moment $M_1$. The turning moment $M_1$ tends to be resisted by a force couple $M_2$ provided by a tension force on the stud 14 and a bearing force on the bushing flange 38 both of which are equal to C.

Stated mathematically, if the turning moment $M_1 = Hy$ and the resistance couple $M_2 = Cx$ then, when the two moments are in balance and $M_1 = M_2$, $Hy = Cx$ and $C = Hy/x$. Where:

H=horizontal component of load P;
Y=height of the point of application of H;
C=resistance force, and
X=force couple arm.

Thus, it can be seen that the force C applied to the flange 38 is a function of the height of force H and also the diameter of the bushing member flange 38.

It is therefore an advantage to reduce y, the height of the line of action of force H. The structural arrangement of parts by which this is achieved in the preferred embodiment is best shown in FIG. 6 which is a laterally separated schematic rendering. As shown in FIG. 6, the horizontal component of force from the load ring 16 is transmitted from the load ring inner conical bearing portion 46 to the stud shank threaded portion 34 through the medium of the bushing member outer and inner conical bearing portions 40 and 42, the retainer member outer conical bearing portion 50 and inner threaded portion 54. There is no corresponding transmission of force between the load ring inner upper portion 48, the bushing member outer and inner upper portions 41 and 44, the retainer member outer and inner upper portions 52 and 56 and the unthreaded upper portion 36 of the stud shank 32.

Because of the above structural relationship of parts, and the consequent lowering of the height of the line of action of the load component force H, the bearing load on the base 12 under the bushing member flange 38 is effectively reduced. Further, the configuration of the threaded retainer member 28, by providing an increased diameter conical lower end, effectively supports the bushing member 24 and hence the assembly as a whole prior to installation without a reduction in the effective diameter of the stud shank 32.

I claim as my invention:

1. A fastening device for anchoring a load to a threaded base, the fastening device comprising:
    (a) a stud including a head and a shank, said shank having a lower threaded portion adapted to be fastened to the base and an adjacent, upper threaded portion,
    (b) a retainer member including an inner surface having a threaded portion, adapted to be received by the stud upper threaded portion, and an outer surface having a bearing portion,
    (c) a bushing member including an inner surface having a bearing portion operatively engageable with the outer bearing portion of the retainer member and an end bearing portion operatively engageable with the base, and
    (d) load attaching means operatively connected to the bushing member in swivel relation for transferring applied load to the bushing member and the stud.

2. A fastening device as defined in claim 1, in which:
    (e) the retainer member inner surface includes a lower portion providing the threaded portion and the retainer member outer surface includes a lower portion providing the bearing portion.

3. A fastening device as defined in claim 2, in which:
(f) the bushing member inner surface includes a lower portion providing the bearing portion and the bushing member outer surface includes a lower portion providing the bearing portion.

4. A fastening device as defined in claim 3, in which:
(g) the load attaching means includes a load ring having an inner surface providing a lower bearing portion engageable with the outer bearing portion of the bushing member.

5. A fastening device as defined in claim 1, in which:
(e) the retainer member outer bearing portion is generally conical, and
(f) the bushing member inner bearing portion is generally conical.

6. A fastening device as defined in claim 1, in which:
(e) the load attaching means includes a load ring,
(f) a collar is disposed about the stud shank operatively engageable with the head,
(g) the bushing member includes an upper end bearing portion operatively engageable with the collar and a lower end flange bearing portion operatively engageable with the base, and
(h) said load ring is received in rotatable relation between said collar and said end flange bearing portion.

7. A fastening device as defined in claim 6, in which:
(i) the retainer member upper end bearing portion is received between the collar and the stud and is operatively engageable with the head of the stud.

8. A fastening device as defined in claim 1, in which:
(e) the load attaching means includes a load ring having an inner surface providing an upper portion and a lower bearing portion,
(f) the retainer member inner surface includes an upper portion spaced from the stud and a lower portion providing the threaded portion, and the retainer member outer surface includes an upper portion, and a lower portion providing the bearing portion, and
(g) the bushing member inner surface includes an upper portion spaced from the retainer member and a lower portion providing the bearing portion, and the bushing member outer surface includes an upper portion spaced from the load ring, and a lower portion providing the bearing portion, said inner and outer bearing portions being engageable with the outer bearing portion of the retainer member and the inner bearing portion of the load ring respectively to lower the line of action of load transfer from the load attaching means.

9. A fastening device as defined in claim 1, in which:
(e) the load attaching means includes a load ring having an inner surface providing an upper portion and a lower generally conical bearing portion,
(f) the retainer member inner surface includes an upper portion spaced from the stud and a lower portion providing the threaded portion, and the retainer member outer surface includes an upper portion, and a lower generally conical portion providing the bearing portion, and
(g) the bushing member inner surface includes an upper portion spaced from the retainer member and a lower generally conical portion providing the bearing portion, and the bushing member outer surface includes an upper portion spaced from the load ring, and a lower generally conical portion providing the bearing portion, said inner and outer bearing portions being engageable with the outer bearing portion of the retainer member and the inner bearing portion of the load ring respectively to lower the line of action of load transfer from the load attaching means.

10. A fastening device as defined in claim 9, in which:
(h) a collar is disposed about the stud shank operatively engageable with the head,
(i) the bushing member includes an upper end margin operatively engageable with the collar and a lower end flange operatively engageable with the base, and
(j) said load ring is received in rotatable relation between said collar and said flange.

11. A fastening device as defined in claim 9, in which:
(h) the retainer member inner and outer surface upper portions are generally cylindrical,
(i) the bushing member inner surface upper portion is generally cylindrical, and said outer surface upper portion is generally conical, and
(j) the load ring inner surface upper portion is generally cylindrical.

* * * * *